United States Patent
Forichon et al.

(10) Patent No.: US 12,427,737 B2
(45) Date of Patent: Sep. 30, 2025

(54) END-OF-LINE WINDING FOR TIRE COMPONENT

(71) Applicant: COMPAGNIE GENERALE DES ETABLISSEMENTS MICHELIN, Clermont-Ferrand (FR)

(72) Inventors: Baptiste Forichon, Clermont-Ferrand (FR); Benjamin Dault, Clermont-Ferrand (FR)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 0 days.

(21) Appl. No.: 18/718,849

(22) PCT Filed: Nov. 2, 2022

(86) PCT No.: PCT/IB2022/060565
§ 371 (c)(1),
(2) Date: Jun. 12, 2024

(87) PCT Pub. No.: WO2023/111710
PCT Pub. Date: Jun. 22, 2023

(65) Prior Publication Data
US 2025/0050604 A1    Feb. 13, 2025

(30) Foreign Application Priority Data
Dec. 16, 2021 (FR) .................................. 2113616

(51) Int. Cl.
*B29D 30/00* (2006.01)

(52) U.S. Cl.
CPC ..... *B29D 30/0016* (2013.01); *B29D 30/0061* (2013.01); *B29D 2030/0038* (2013.01); *B29D 2030/0083* (2013.01)

(58) Field of Classification Search
CPC ........ B29D 30/0016; B29D 2030/0022; B29D 2030/0038; B29D 2030/0061;
(Continued)

(56) References Cited

U.S. PATENT DOCUMENTS 4,907,689 A * 3/1990 Focke ................... B65G 47/61
                                                      198/465.4
2022/0203638 A1  6/2022 Vecchione et al.

FOREIGN PATENT DOCUMENTS

CN    204204812 U  *  3/2015
EP        3756870 A1    12/2020
WO    2010015782 A2     2/2010

OTHER PUBLICATIONS

Chen H, CN-204204812-U, machine translation. (Year: 2015).*
(Continued)

*Primary Examiner* — Sedef E Paquette
(74) *Attorney, Agent, or Firm* — Neal P. Pierotti

(57) ABSTRACT

An apparatus is provided that has a bobbin and a tire component. The apparatus also has a pivot arm that pivots about a pivot arm axis to move the bobbin from a ready position to a winding position and to an unloading position. The pivot arm rotates the bobbin to effect winding of the tire component onto the bobbin when the bobbin is located in the winding position. An attachment member is provided that effects attachment of the tire component to the bobbin. Further, a cutter is present that cuts the tire component.

16 Claims, 7 Drawing Sheets

(58) Field of Classification Search
CPC .... B29D 2030/0077; B29D 2030/0083; B60C 11/24; B60C 11/243
USPC ...................................... 156/110.1, 111, 117
See application file for complete search history.

(56) References Cited

OTHER PUBLICATIONS

European Patent Office, International Search Report and Written Opinion, dated Mar. 13, 2023, pp. 1-11 (included), European Patent Office, Rijswijk, The Netherlands.

* cited by examiner

[Fig. 1]
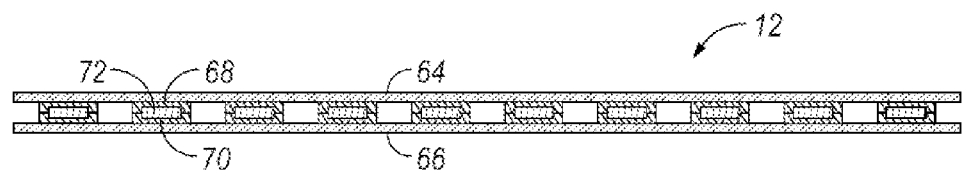
[Fig. 2]
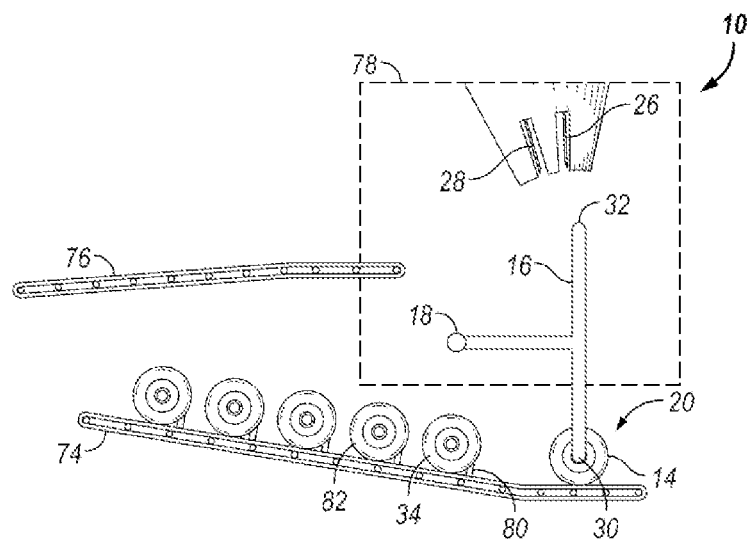
[Fig. 3]
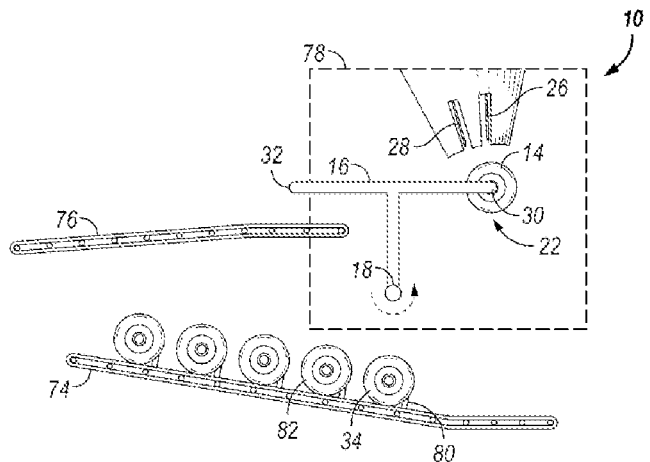

[Fig. 4]
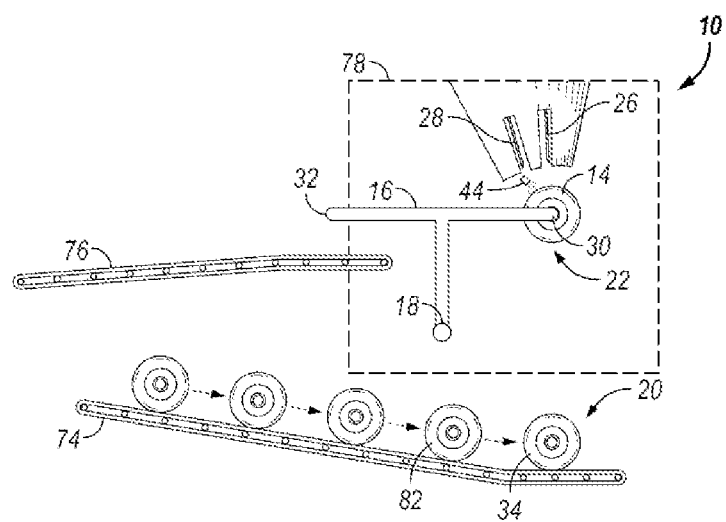
[Fig. 5]
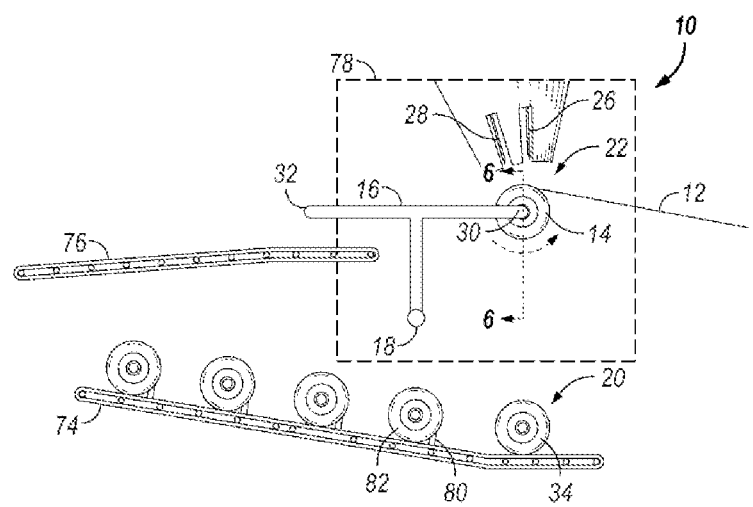

[Fig. 6]
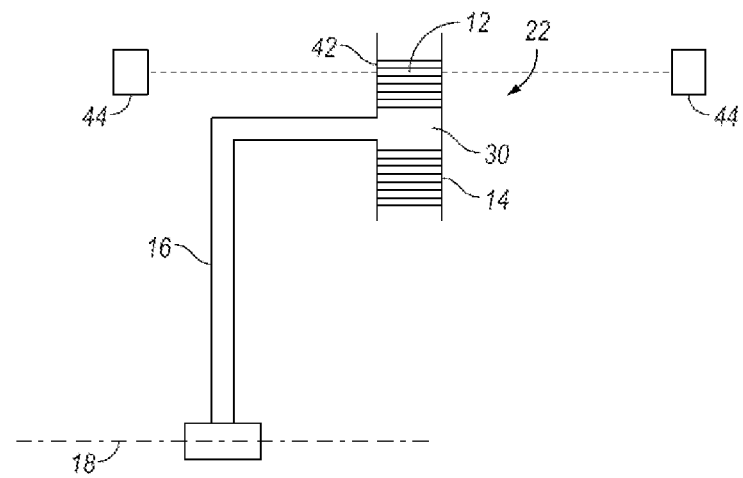
[Fig. 7]
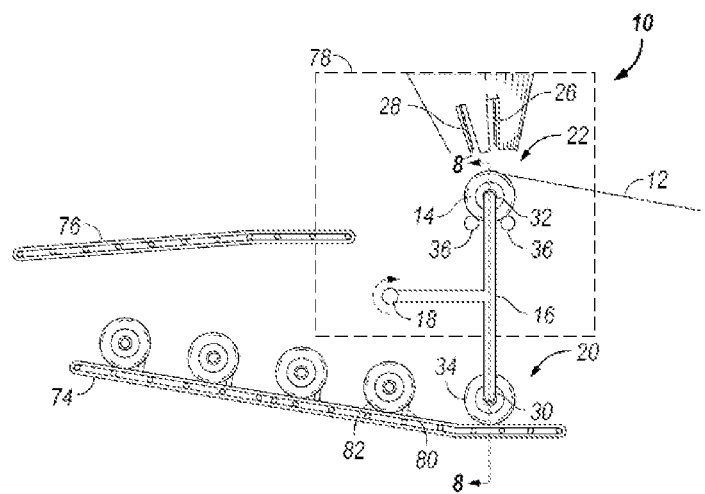

[Fig. 8]
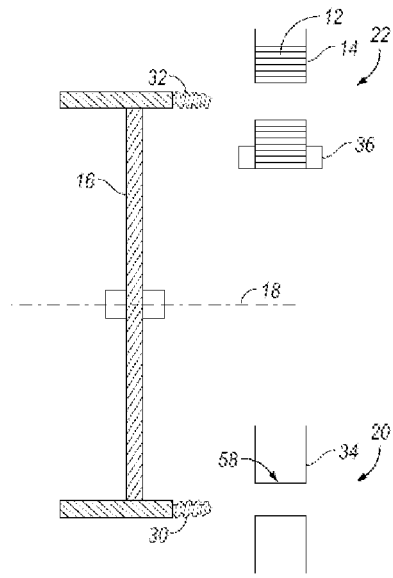
[Fig. 9]
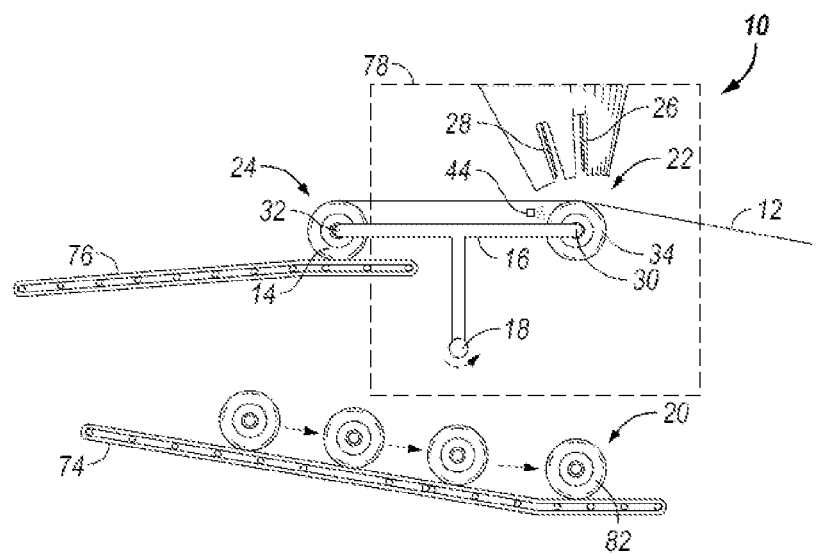

[Fig. 10]
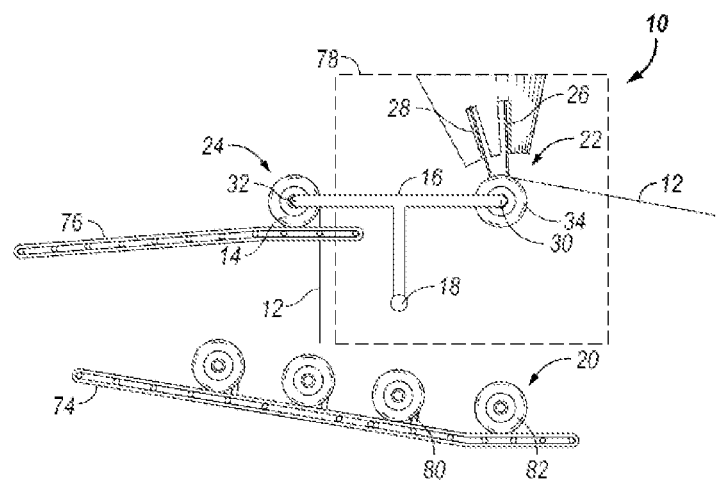
[Fig. 11]
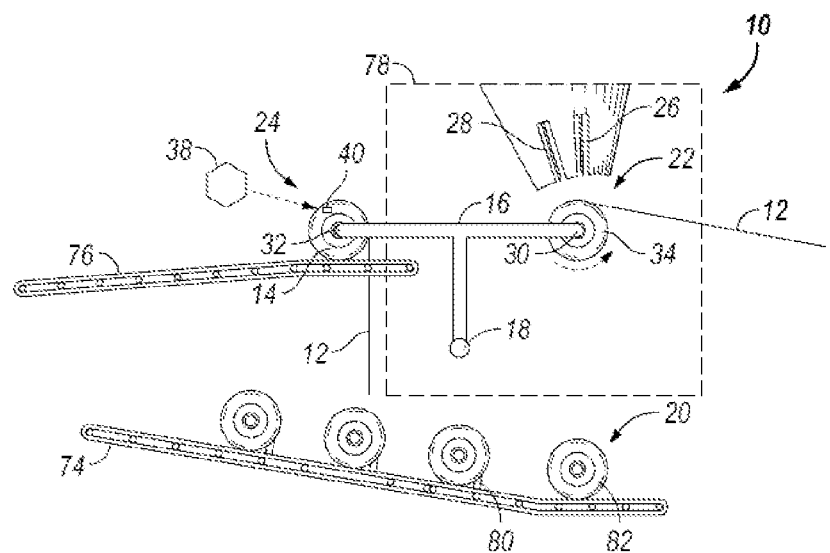

[Fig. 12]
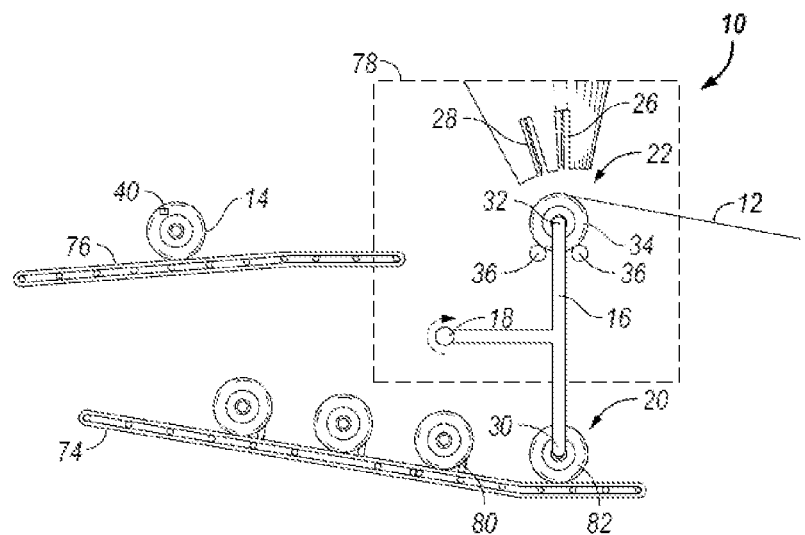
[Fig. 13]
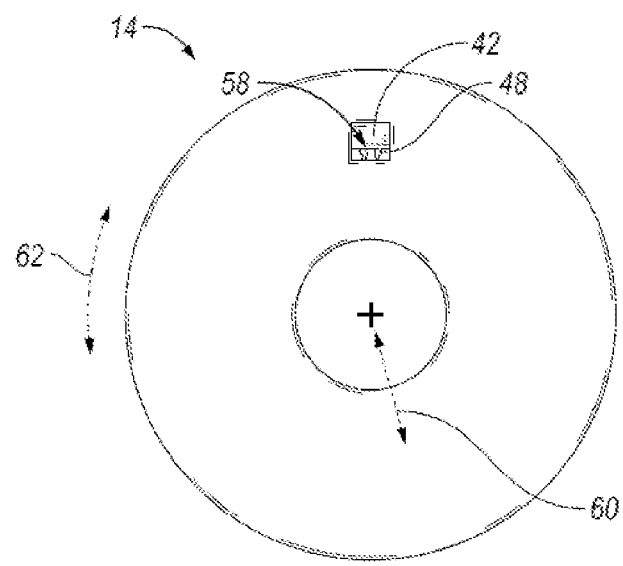

[Fig. 14]
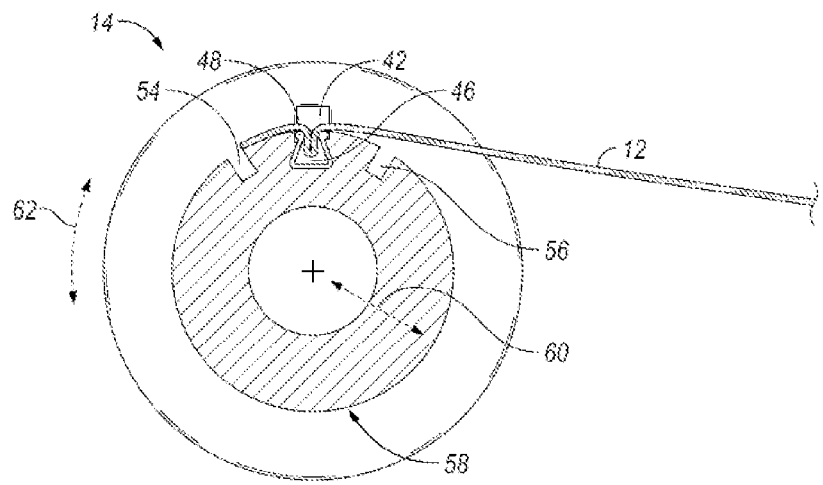
[Fig. 15]
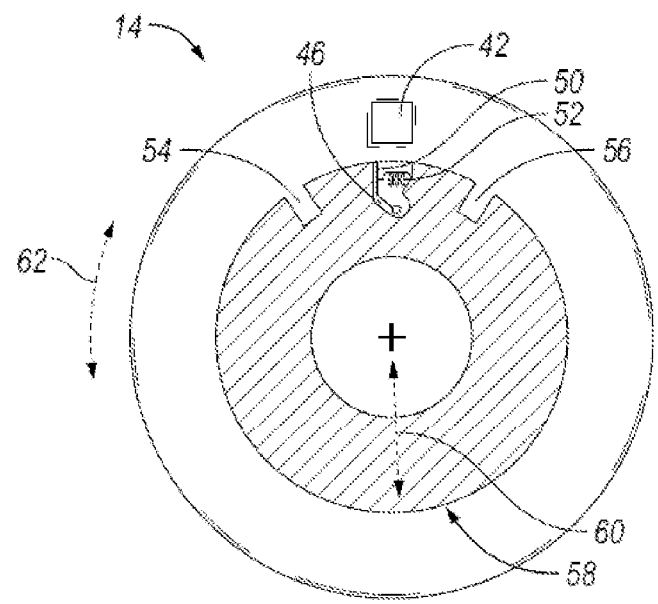

END-OF-LINE WINDING FOR TIRE COMPONENT

CROSS-REFERENCE TO RELATED APPLICATIONS

The present application is a 35 U.S.C. § 371 application of PCT/IB2022/060565 filed on Nov. 2, 2022 and entitled "End-of-Line Winding for Tire Component" and claims benefit thereto. PCT/IB2022/060565 claims priority to French patent application number FR2113616 filed on Dec. 16, 2021. The entire contents of PCT/IB2022/060565 and FR2113616 are incorporated by reference herein in their entireties for all purposes.

FIELD OF THE INVENTION

The subject matter of the present invention relates to an end-of-line winding for use in the manufacturing of tire components such as semi-finished RFID tire components. More particularly, the present application involves an automatic end-of-line winding machine that winds the tire component onto a bobbin through the use of a pivot arm, attachment member, and cutter.

BACKGROUND OF THE INVENTION

Tires are equipped with RFID technology in order to transmit information, such as the identity of the tire, to connect the tires with their environment. The RFID tire component can be an electronic chip or tag that includes an antenna. In some instances, the RFID tire component includes this chip or tag within a sleeve of rubber and potentially one or more pieces of plastic film. The RFID tire component is placed on the interior surface of the tire, or within the tire so as to be between various layers of the tire.

To construct the RFID tire component, the tags are cut or produced by manual operation or by auxiliary semi-automatic processing equipment. Since the machining operation levels of the staff are different, work efficiency is reduced, and resources are wasted. Manual operation or auxiliary semi-automatic processing equipment may cause secondary pollution to the material strip which is chip packaged. As the RFID tire component is not produced by an automatic process, cold rubber is often present at one or more stages of manufacturing which is difficult to work with and may result in manufacturing defects in the finished product. The winding of other tire components, both electronic in nature and non-electronic in nature, also presents challenges in the manufacturing process. The production efficiency of tire components would be improved by an automated process. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of an RFID tire component.

FIG. 2 is a side view of an apparatus before any winding of the RFID tire component onto any of the bobbins.

FIG. 3 is a side view of the apparatus with the first bobbin moved into the winding position.

FIG. 4 is a side view of the apparatus with the first bobbin rotated to a desired orientation while in the winding position.

FIG. 5 is a side view of the apparatus with the RFID tire component initially attached to the first bobbin for winding of the RFID tire component thereon.

FIG. 6 is a cross-sectional view taken along line 6-6 of FIG. 5.

FIG. 7 is a side view of the apparatus with the retainer holding the wound first bobbin with the pivot arm pivoted to pick up a second bobbin at the ready position.

FIG. 8 is a cross-sectional view taken along line 8-8 of FIG. 7.

FIG. 9 is a side view of the apparatus with the pivot arm rotated to put the wound bobbin into the unloading position and the second bobbin into the winding position.

FIG. 10 is a side view of the apparatus in which the cutter cuts the RFID tire component, and the attachment member attaches the RFID tire component to the second bobbin in the winding position.

FIG. 11 is a side view of the apparatus in which the labeler applies a label to the wound roll and the RFID tire component is wound onto the second bobbin.

FIG. 12 is a side view of the apparatus in which the pivot arm is moved into position to capture a third bobbin in the ready position, and the first bobbin is moved by the removal conveyor.

FIG. 13 is a side view of a bobbin in accordance with one exemplary embodiment.

FIG. 14 is a cross-sectional view of the bobbin of FIG. 13 with an RFID tire component attached to the bobbin.

FIG. 15 is a cross-sectional view of an alternative exemplary embodiment of the bobbin with an attachment consisting of a retaining plate and spring.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that can execute an automatic end of line winding for the manufacturing of tire components, such as a semi-finished RFID tire component 12. The tire component 12 that is wound can be any type of tire component 12, whether an electronic based tire component or a non-electronic based tire component. For purposes of explanation, the tire component 12 in the drawings and description will be referred to as an RFID tire component 12, but again it is to be understood that this is only one exemplary type of tire component 12 used for explanation and the apparatus 10 is not limited to the use of an RFID tire component 12 therewith. The apparatus 10 winds the RFID tire component 12 onto a bobbin 14 and utilizes a pivot arm 16 to cycle the bobbin 14 from a ready position 20 to a winding position 22 and then to an unloading position 24. In order to attach the RFID tire component 12 to the bobbin 14, the apparatus 10 utilizes an attachment member 26. Further, a cutter 28 is used by the apparatus 10 to cut the RFID tire component 12 once the RFID tire component 12 is wound onto the bobbin 14 at the winding position 22. The apparatus 10 can wind the RFID tire component 12 automatically without user intervention so that bobbin 14 with wound RFID tire component 12 can be generated. In some instances, user intervention may take place and may involve placement of empty bobbins 14 onto the supply conveyor 74 and removal of full bobbins 14 from a removal conveyor 76. In other instances, the initial bobbin 14 may have its RFID tire component 12 attached thereto by the use of manual intervention, while subsequent bobbins 14 after the one initial bobbin 14 have RFID tire component 12 attached automatically.

An exemplary RFID tire component 12 is illustrated with reference to FIG. 1. It is to be understood that the disclosed configuration of the RFID tire component 12 in FIG. 1 is exemplary and that other configurations are possible in other embodiments. The RFID tire component 12 includes an RFID chip 72 that is an electronic part capable of identifying the tire into which it is installed. The RFID chip 72 is sandwiched between a first rubber piece 68 and a second rubber piece 70 that together encapsulate the RFID chip 72 within rubber. The rubber pieces 68, 70 may be uncured rubber or can be cured in certain exemplary embodiments. The rubber pieces 68, 70 are in turn located between a first plastic film 64 and a second plastic film 66 that are each continuous pieces of plastic. Although described as being plastic for sake of example, the pieces 64, 66 could be textile films in other embodiments or made of yet other material in yet additional embodiments. These films 64, 66 may be cling film and can be peeled off the RFID tire component 12 when application to the tire is desired. The RFID tire component 12 may thus be constructed of a number of intermediate RFID chips 72 and rubber pieces 68, 70 spaced from one another and located between continuous plastic films 64, 66. In other embodiments, the RFID chips 72 could be rotated 90 degrees from where they are shown in FIG. 1 to be straight up and down. The rubber pieces 68, 70 in these embodiments where the RFID chips 72 are rotated 90 degrees are likewise rotated 90 degrees from what is shown in FIG. 1 so that they are straight up and down. The RFID tire component assembly can be put onto a bobbin 14 for transport to a tire manufacturing facility or other location for installing the RFID chip 72 into a particular tire. It is to be understood that the apparatus 10 described herein may be used to manufacture an RFID tire component 12 of any construction and that the disclosed arrangement of the RFID tire component 12 of FIG. 1 is but one possibility.

FIG. 2 is a schematic view of an apparatus 10 in accordance with one exemplary embodiment. The apparatus 10 includes a frame 78 onto which various other components are mounted. Empty bobbins 14 are supplied via a supply conveyor 74 that can be inclined and/or motorized. The bobbins 14 are spaced from one another on the supply conveyor 74, and blockers 80 can be used to prevent the bobbins 14 from jamming and to minimize impacts they may suffer upon hitting into subsequent bobbins 14. The blockers 80 may be cylinders in some embodiments. The bobbins 14 can be manually placed onto the supply conveyor 74 or they may be automatically provided via a supply queue, and any number of bobbins 14 can be on the supply conveyor 74. In some embodiments a maximum of eight bobbins 14 are present on the supply conveyor at any one given time. The lead bobbin 14 is located in a ready position 20 where it can be engaged by a pivot arm 16 of the apparatus 10. The configuration shown in FIG. 2 is before the apparatus 10 has wound any of the RFID tire component 12 onto any of the bobbins 14 and can be described as being an initial position of the winding process of the apparatus 10 as the RFID tire component 12 has not yet even engaged any of the bobbins 14.

The pivot arm 16 is pivotally mounted onto the frame 78 and pivots about a pivot arm axis 18. The pivot arm 16 may be a rocker arm in that it does not pivot 360 degrees about the pivot arm axis 18, but instead rotates an amount less than 360 degrees. In some instances, the pivot arm 16 has a rotational range of not more than 90 degrees about the pivot arm axis 18. In other instances, the pivot arm 16 has a rotational range of no more than 120 degrees about the pivot arm axis 18. In yet other embodiments, the pivot arm 16 has a rotational range of no more than 70 degrees about the pivot arm axis 18. In the disclosed embodiment, the pivot arm 16 has a rotational range of 90 degrees about the pivot arm axis 18 and is at the limit of this range in FIG. 2 in which it can engage the bobbin 14 in the ready position 20.

The pivot arm 16 can be configured to engage the bobbin 14 to move the bobbin 14, and can be configured to disengage from the bobbin 14 so that the pivot arm 16 can move without moving the bobbin 14. The pivot arm 16 may include a first engagement member 30 and a second engagement member 32 that function to engage to the bobbin 14 and disengage from the bobbin 14 to allow for movement and for release of the bobbin 14. In the position shown in FIG. 2 the first engagement member 30 of the pivot arm 16 engages and holds onto the bobbin 14 in the ready position 20. No other bobbins 14 are engaged by the pivot arm 16.

The pivot arm 16 rotates about the pivot arm axis 18 in a counter clockwise direction 90 degrees to the position shown in FIG. 3. In so doing, the bobbin 14 is moved from the ready position 20 to the winding position 22. At this point, there is no RFID tire component 12 located on any of the bobbins 14. In the winding position 22, the bobbin 14 is located proximate to an attachment member 26 and a cutter 28 that are carried by the frame 78. The attachment member 26 is an element that can move relative to the frame 78 such that it can move towards and away from the bobbin 14 when the bobbin 14 is in the winding position 22. The attachment member 26 does not cut the RFID tire component 12 when it does engage the RFID tire component 12. The cutter 28 likewise moves relative to the frame 78 such that the cutter 28 moves towards and away from the bobbin 14 when the bobbin 14 is in the winding position 22. The attachment member 26 and cutter 28 may both be arranged so that they move in the radial direction of the bobbin 14 in the winding position 22 so that they 26, 28 move towards and away from the axis about which the bobbin 14 rotates while in the winding position 22.

The first engagement member 30 is configured so that it can rotate the bobbin 14 three hundred and sixty degrees. With reference to FIG. 4, the bobbin 14 in the winding position 22 is rotated by the first engagement member 30, without RFID tire component 12 attached, until the bobbin 14 is registered into the correct orientation relative to the attachment member 26 and the cutter 28. Any number of mechanisms can be used to ensure the bobbin 14 is rotated into the correct position when in the winding position 22. In one embodiment, the bobbin 14 is provided with a positioning window 42 through which a beam can be directed by a sensor 44 to determine the position of the positioning window 42 and hence the positioning of the bobbin 14 that includes the positioning window 42. The sensor 44 and the positioning window 42 can thus be used to determine the correct position of the bobbin 14 so the first engagement member 30 knows to stop rotation of the bobbin 14 when in the winding position 22.

The blockers 80 can be retracted to allow the bobbins 14 on the supply conveyor 74 to move forward such that another bobbin, here designated at the second bobbin 34, is put into the ready position 20. Again, although described as using blockers 80 to prevent movement of the bobbins 14 on the supply conveyor 74, blockers 80 need not be utilized in other arrangements as the bobbins 14 can be transported to the ready position 20 by various mechanisms and elements. With reference now to FIG. 5, the blockers 80 can be again put into position to prevent further movement of the bobbins 14 along the supply conveyor 74.

FIG. 5 also shows the attachment of the RFID tire component 12 to the first bobbin 14. This attachment can be a manual attachment in which an operator pulls the RFID tire component 12 to the first bobbin 14 and manually attaches these components.

Alternatively, the attachment of the RFID tire component 12 to the first bobbin 14 can be executed automatically, for example by having the attachment member 26 move into engagement with the RFID tire component 12 and push it into a receiving cavity 46 of the first bobbin 14 to effect attachment of the RFID tire component 12 to the first bobbin 14. The apparatus 10 can thus be constructed so that all steps of winding up the RFID tire component 12 onto the bobbins 14 are done automatically, or so that some manual steps are performed but automatic winding does occur. In this regard, the very first bobbin 14 could have an operator manually attach the RFID tire component 12, but the rest of the RFID tire component 12 attachments to the subsequent bobbins 14 are effected automatically by the apparatus 10. The automatic winding of the RFID tire component 12 allows the apparatus 10 to work with hot rubber to save time and increase workability of the components going into the RFID tire component 12.

FIG. 6 is a cross-sectional view taken along line 6-6 of FIG. 5 that shows a portion of the apparatus 10 that better illustrates the lateral configuration of the apparatus 10. The first engagement member 30 is located within a central bore of the first bobbin 14 and is expanded so that it engages the first bobbin 14 to be able to rotate and/or move the first bobbin 14. This expansion may be caused by having the first engagement member 30 have a bladder that can expand via fluid put into the bladder, or may be caused by having the first engagement member 30 have an expandable chuck. The inflation or expansion may be caused by a pneumatic or hydraulic system. Alternatively, the engagement, and potentially rotation of the first engagement member 30 to the first bobbin 14 can be achieved by a system of keying, clamping, pinning, or any other mechanism.

The first engagement member 30 can rotate so that its rotation causes the attached first bobbin 14 to also rotate 360 degrees. The rotation of the first engagement member 30 may be caused by a motorization attached to the pivot arm 16. This rotation causes the attached RFID tire component 12 to be wound onto the first bobbin 14. The first engagement member 30 may thus rotate the bobbin 14 in order to properly orient the bobbin 14, and may rotate the bobbin 14 to wind RFID tire component 12 onto the bobbin 14. Any number or rotations of the first bobbin 14 can be executed to cause any desired amount of the RFID tire component 12 to be wound onto the first bobbin 14. FIG. 6 also shows the sensor 44, that can be mounted onto the frame 78. The sensor 44 may have portions positioned on either side of the first bobbin 14 in the lateral direction, and one of the sensor 44 portions can direct a beam of light in the lateral direction that is detected by the other one of the sensor 44 portions on the opposite side of the first bobbin 14 if the positioning window 42 is aligned to allow the beam of light to pass through. In this manner, the sensor 44 can detect the presence of the positioning window 42 and hence know the angular orientation of the first bobbin 14 about its rotational axis. As the winding of the RFID tire component 12 commences, the use of the sensor 44 and the positioning window 42 does not need to be utilized as these components are used to determine the position of the bobbin 14 for purposes of attaching the RFID tire component 12 to the bobbin 14, and for potentially cutting the RFID tire component 12.

After the RFID tire component 12 has been wound onto the first bobbin 14 to a desired amount, a retainer 36 can be used to retain the bobbin 14 in the winding position 22. FIGS. 7 and 8 show the retainer 36 engaging the wound first bobbin 14. In some embodiments, the retainer 36 can be carried by the frame 78 and can move in the lateral direction to be located under the first bobbin 14. The first engagement member 30 can be disengaged from the first bobbin 14, and the pivot arm 16 can be rotated 90 degrees in the clockwise direction about the pivot arm axis 18. With reference to FIG. 8, if the first engagement member 30 includes a bladder it can be deflated to be disengaged from the first bobbin 14. The first engagement member 30 can then be moved in the lateral direction so that it clears the first bobbin 14 and can rotate about the pivot arm axis 18 without hitting the first bobbin 14. This movement in the lateral direction, which is the same direction as movement parallel to the pivot arm axis 18, can be seen upon comparing the positions of the first engagement member 30 between FIGS. 6 and 8. The second engagement member 32 can be linked with the first engagement member 30 such that lateral movement occurs at the same time between both of these members 30, 32 such that if one moves the other will also move. When the engagement members 30, 32 are moved in the lateral direction away from the bobbins 14, 32 the pivot arm 16 can rotate about the pivot arm axis 18 without needing to move the bobbins 14, 32. In some arrangements, the entire pivot arm 16 moves in the lateral direction which will likewise cause both engagement members 30, 32 to likewise move in the lateral direction. In other embodiments, portions of the pivot arm 16 do not move in the lateral direction but the engagement members 30, 32 can move in the lateral direction.

The retainer 36 is shown as being a pair of rollers or bars that cradle the first bobbin 14 in the winding position 22. When the first engagement member 30 is removed, the first bobbin 14 remains in the winding position 22 and the pivot arm 16 rotates 90 degrees clockwise to the FIGS. 7 and 8 position in which the first engagement member 30 is located at the ready position 20 with the second bobbin 34, that is an empty bobbin with no RFID tire component 12 rolled thereon. The second engagement member 32 is located at the winding position 22 but does not engage the first bobbin 14, and the RFID tire component 12 still extends from the first bobbin 14 and is not cut therefrom.

Once the pivot arm 16 is positioned as shown in FIG. 7, the first and second engagement members 30, 32 can again be actuated so that they move in the lateral direction to be inside of the bores of the bobbins 14, 34 and expanded to engage the bobbins 14, 34. The retainer 36 can be retracted or otherwise disengaged as it is no longer needed to hold the first bobbin 14. The first bobbin 14 is now engaged and held by the second engagement member 32, and the second bobbin 34 in the ready position 20 is now engaged and held by the first engagement member 30. The pivot arm 16 can now rotate 90 degrees in the counterclockwise direction to achieve the positioning as shown with reference now to FIG. 9. The first bobbin 14 is now moved to the unloading position 24, and the second bobbin 34 is moved into the winding position 22. With the second bobbin 34 moved out of the way, a subsequent third bobbin 82 is moved into the ready position 20 and the bobbins 14 on the supply conveyor 74 are indexed forward closer to the ready position 20. The RFID tire component 12 on the first bobbin 14 remains on the first bobbin 14 and extends across the second bobbin 34 and may or may not engage the second bobbin 34 at this point in the process. The first engagement member 30 will rotate the second bobbin 34 until it is oriented in a desired position such that the attachment member 26 and cutter 28 can work to effect attachment and cutting of the RFID tire component 12. The sensor 44 may again be used by the apparatus 10 in combination with the positioning window 42 of the second bobbin 34 to allow the apparatus 10 to know the orientation of the second bobbin 34 about its rotational axis so that it can be put into a desired rotational orientation at the winding position 22. The apparatus 10 can be configured so that the first engagement member 30 can rotate to cause rotation of the bobbins, but the second engagement member 32 does not rotate and is not capable of rotating to rotate the bobbins.

With the RFID tire component 12 extending from the first bobbin 14 to the second bobbin 34 and past the second bobbin 34 to its supply, FIG. 10 shows the cutting and attachment of the RFID tire component 12. The cutter 28 is actuated so that it moves into engagement with the RFID tire component 12 at the winding position 22 and cuts the RFID tire component 12 which is shown as hanging from the first bobbin 14 but still attached to the first bobbin 14. The cutter 28 can be a linearly moving blade that cuts the RFID tire component 12, but can be variously configured in other embodiments. For example, the cutter 28 could be a chisel, a rotating blade, an ultrasound device that can cut material, a heated device that can cut material, or any other member capable of cutting the RFID tire component 12. The attachment member 26 is actuated and moves into engagement with the RFID tire component 12 to cause the RFID tire component 12 to be attached to the second bobbin 34. The attachment member 26 and cutter 28 can be actuated simultaneously so that they execute the attachment and cutting of the RFID tire component 12 at the same time. In other embodiments, the attachment member 26 is actuated before the cutter 28 and attaches the RFID tire component 12 to the second bobbin 34 first, followed by actuation of the cutter 28 which then cuts the RFID tire component 12. Any sequence of actuation, or simultaneous actuation of the attachment member 26 and cutter 28 can be used by the apparatus 10. The blockers 80 can be once again used to prevent forward movement of the bobbins 14 on the supply conveyor 74.

After cutting and attaching the RFID tire component 12, the attachment member 26 and cutter 28 can be retracted away from the second bobbin 34 as shown in FIG. 11. The second bobbin 34 with the now attached RFID tire component 12 can be rotated via the first engagement member 30 to cause the RFID tire component 12 to be wound onto the second bobbin 34 from the supplied source of RFID tire component 12. As the winding occurs at the winding position 22, a labeler 38 is used to attach a label 40 to the now wound first bobbin 14 in the unloading position 24. The labeler 38 can be carried by the frame 78 and can be automatically actuated so that an operator is not needed to apply the label 40 to the wound first bobbin 14. The label 40 is used to identify the RFID tire component 12 that is on the particular bobbin 14. The label 40 is placed onto the bobbin 14 and not onto the RFID tire component 12. The label 40 could be an RFID chip, an engraved barcode, or a QR code to allow identification. When the label 40 is applied, winding may be occurring simultaneously at the winding position 22.

FIG. 12 shows the next step in the process in which the wound, labeled first bobbin 14 is moved from the unloading position 24 and along the removal conveyor 76. The output of the apparatus 10 is the production of the bobbin 14 with the wound RFID tire component 12 and preferably the label 40. The remaining RFID tire component 12 that was not wound in FIG. 11 can be wound onto the first bobbin 14 upon its rotation on the removal conveyor 76. Alternatively, the amount of the RFID tire component 12 that is between the first bobbin 14 and the cutter 28 can be so little that it naturally wraps around the RFID tire component 12 on the first bobbin 14 when cut. The removal conveyor 76 may be a motorized conveyor that transports the completed first bobbin 14, or may simply be inclined to effect movement of the first bobbin 14 away from the unloading position 24. As such, in some embodiments the removal conveyor 76 is inclined and uses only gravity to remove the wound bobbins 14. The second engagement member 32 disengages from the first bobbin 14, and moves away from the bobbin 14 in the lateral direction to allow the wound first bobbin 14 to move out of the unloading position 24 and along the removal conveyor 76. The first engagement member 30 can also disengage from the second bobbin 34 and likewise move in the lateral direction to allow it and the pivot arm 16 to rotate 90 degrees in the clockwise direction. Before the first engagement member 30 disengages from the second bobbin 34 at the winding position 24, the retainers 36 are actuated to cause the second bobbin 34 to be held in the winding position 24. The pivot arm 16 can assume the position shown in FIG. 12 in which the first engagement member 30 is once again located in the ready position 20 to capture the third bobbin 82. The second engagement member 32 is at the winding position 22 and may engage the second bobbin 34 that already has the RFID tire component 12 attached thereon.

At this point in the process, the configuration of the apparatus 10 and bobbins 14 is the same as that with reference back to FIG. 7. The apparatus 10 can continue on with the steps from the point in FIG. 7 to those in FIG. 12 to produce another, subsequent bobbin with wound RFID tire component 12 thereon that is preferably labeled 40. The sequence can then go back to FIG. 7 and repeat as often as desired in order to produce as much wound RFID tire component 12 on bobbins as is necessary. The entire process of winding the RFID tire component 12 to produce as many bobbins 14 with wound RFID tire component 12 can be automatically executed by the apparatus 10 with the exception of potentially loading bobbins 14 onto the supply conveyor 74, removing wound bobbins 14 from the removal conveyor 76, and/or attaching RFID tire component 12 to the initial first bobbin 14 as shown and described in FIG. 5. However, all or any of these three exceptions to the automatic operation of the apparatus 10 can be eliminated in some embodiments so that the apparatus 10 is completely or close to completely automatic in operation. The apparatus 10 may thus automatically make semi-finished RFID tire component 10.

An exemplary embodiment of the bobbin 14 is shown with reference to FIG. 13. All or any number of the bobbins 14 in the apparatus 10 can be configured as shown and described. The bobbin 14 is round in shape and includes a circular center that extends completely through the bobbin 14 in a width direction of the bobbin 14. A circumferential direction 62 extends around the perimeter of the bobbin 14, and a radial direction 60 extends through the center of the bobbin 14. The positioning window 42 extends through the bobbin 14 in the width direction. The positioning window 42 is square in shape but could be any shape in other embodiments. The bobbin 14 has a pair of flanges on either end in the width direction so the positioning window 42 is configured as a pair of square windows through each one of those flanges while the interior portion of the bobbin 14 is a void and thus the positioning window 42 is discontinuous through the bobbin 14 in the width direction. However, even though the positioning window 42 is discontinuous the beam from the sensor 44 will be uninterrupted upon being directed through the positioning window 42 and thus allowed to pass completely through the bobbin 14. The clip 48 and winding surface 58 are visible in the positioning window 42 as the positioning window 42 is located in the radial direction 60 at the same location as portions of these elements 48, 58. In this regard, the positioning window 42 may be at the same location in the radial direction 60 as the winding surface 58.

FIG. 14 is a cross-sectional view of the bobbin 14 of FIG. 13 with an attached RFID tire component 12 that shows the winding surface 58 that extends completely around the center of the bobbin 14 three hundred and sixty degrees in the circumferential direction 62. The RFID tire component 12 is placed onto the winding surface 58 and is built onto itself any number of layers as desired upon rotation of the bobbin 14 about its center axis. In order to attach the RFID tire component 12 to the bobbin 14, a receiving cavity 46 is present and extends from the winding surface 58 towards the center of the bobbin 14 in the radial direction 60. The receiving cavity 46 includes a clip 48 that can be made of metal or plastic. For attachment, the RFID tire component 12 is located on or just above the winding surface 58 and the attachment member 26 moves in the radial direction 60 towards the center of the bobbin 14 and engages the RFID tire component 12 and pushes it into the receiving cavity 46. The attachment member 26 then retracts and moves out of engagement with the RFID tire component 12. The attachment member 26 may at its greatest extent be positioned within the receiving cavity 46, or the attachment member 26 may not be located within the receiving cavity 46 at any point during operation. The clip 48 engages the RFID tire component 12 as it is within the receiving cavity 46 and retains it therein. The clip 48 can apply pressure to the RFID tire component 12 in some instances when it is provisioned with a spring like characteristic. The RFID tire component 12 can fold onto itself within the receiving cavity 46.

The attachment member 26 is a member capable of moving the RFID tire component 12 into the receiving cavity 46 and potentially pushing the clip 48 or other member open against its spring force to secure the RFID tire component 12 to the bobbin 14. However, the attachment member 26 can be configured differently in other exemplary embodiments. For example, the attachment member 26 may be a sticky material on the bobbin 14, and the bobbin 14 need not be provided with a receiving cavity 46, clip 48 or other member. The attachment member 26 could alternatively be a clip or staple or any other member capable of effecting attachment of the RFID tire component 12 to the bobbin 14. The attachment member 26 is shown in the embodiments as being a component separate from and not carried by the bobbin 14 but capable of engaging the RFID tire component 12 and attaching it to the bobbin 14 using other features such as the receiving cavity 46 and clip 48. However, the attachment member 26 in other embodiments need not be a component separate from the bobbin 14 and could be completely contained on the bobbin 14, or could be both contained on the bobbin 14 and separate from the bobbin 14. The attachment member 26 thus is a component that functions to facilitate attachment of the RFID tire component 12 to the bobbin 14 by itself or in addition to other components in accordance with various exemplary embodiments.

The bobbin 14 also includes a first cutting cavity 54 spaced from the receiving cavity 46 in the circumferential direction 62. The first cutting cavity 54 extends from the winding surface 58 towards the rotational axis of the bobbin 14 in the radial direction 60. The first cutting cavity 54 allows the cutter 28 to more easily cut the RFID tire component 12. In this regard, the RFID tire component 12 overlays the first cutting cavity 54 either engaging the winding surface 58 on either side of the first cutting cavity 54 in the circumferential direction 62 or being positioned above and out of engagement with the winding surface 58 on one or both sides of the first cutting cavity 54 in the circumferential direction 62. When the cutter 28 is actuated, it will engage the RFID tire component 12 and will move into the first cutting cavity 54 upon cutting the RFID tire component 12. The first cutting cavity 54 thus facilitates cutting of the RFID tire component 12 by giving the cutter 28 space to break the RFID tire component 12. The cutter 28 may cut the RFID tire component 12 at a location closer to the unloading position 24 than the receiving cavity 46 is to the unloading position 24.

The first cutting cavity 54 may be located 5 degrees in the circumferential direction 62 from the receiving cavity 46, or may be from 5-10 degrees, from 10-15 degrees, or from 1-5 degrees in accordance with various exemplary embodiments. The bobbin 14 features a second cutting cavity 56 that is configured the same as the first cutting cavity 54 but located on the other side of the receiving cavity 46 in the circumferential direction 62. The second cutting cavity 56 can be spaced the degrees from the receiving cavity 46 as just discussed with respect to the first cutting cavity 54. In this regard, whatever distance the first cutting cavity 54 is spaced from the receiving cavity 46 in the circumferential direction 62, the second cutting cavity 56 is spaced the same amount, although opposite direction, from the receiving cavity 46. The receiving cavity 46 is thus located between both of the cutting cavities 54, 56 in the circumferential direction 62. The second cutting cavity 56 can be used by the apparatus 10 to allow the cutter 28 to cut the RFID tire component 12 in the same way as previously described with respect to the first cutting cavity 54 and a repeat of this information is not necessary. The bobbin 14 is provided with two cutting cavities 54, 56 to ensure that at least 1 of these cutting cavities 54 or 56 is properly positioned below the cutter 26 in the radial direction 60. The bobbin 14 could thus be flipped on the supply conveyor 74 and in either position one of the cutting cavities 54, 56 is always properly positioned relative to the cutter 28 when the bobbin 14 is located in the winding position 22. The bobbin 14 can thus be oriented in either direction when the operator loads the bobbin 14 onto the supply conveyor 74 or when the automatic loading loads the bobbin 14 onto the supply conveyor 74.

FIG. 15 is another embodiment of the bobbin 14 that includes a different mechanism of attaching the RFID tire component 12 to the bobbin 14. The bobbin 14 includes a retaining plate 50 that is located within the receiving cavity 46. The bobbin 14 also has a spring 52 that acts against the retaining plate 50 to push the bobbin 14 to the end of the receiving cavity 46. The attachment member 26 can push the RFID tire component 12 between the retaining plate 50 and the side of the bobbin 14 within the receiving cavity 46. The force of the attachment member 26 will compress the spring 52 and cause the RFID tire component 12 to be pushed into the receiving cavity 46 between the retaining plate 50 and the side of the bobbin 14 in the receiving cavity 46. When the attachment member 26 is removed, the RFID tire component 12 will remain within the receiving cavity 46 and the force of the spring 52 to cause the retaining plate 50 to push against the RFID tire component 12 and trap it within the receiving cavity 46 to function to retain the RFID tire component 12 onto the bobbin 14. The other elements of the bobbin 14 such as the positioning window 42, receiving cavities 54, 56, and winding surface 58 can be configured as previously discussed and a repeat of this information is not necessary.

The apparatus 10 has been described as an "end-of-line winding" in this application because the apparatus 10 winds the RFID tire component 12 after the RFID tire component 12 has been partially or fully assembled. The apparatus 10 may be part of a greater machine that assembles the RFID tire component 12 that is subsequently transferred to the apparatus 10 for end-of-line winding. Alternatively, the apparatus 10 could be a stand alone machine in which the RFID tire component 12 is produced and transferred from a remote location to the apparatus 10 at which point it is wound onto the bobbins 14 by the apparatus 10.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An apparatus, comprising:
   a tire component;
   a bobbin;
   a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;
   an attachment member that effects attachment of the tire component to the bobbin; and
   a cutter that cuts the tire component;
   wherein the pivot arm has a first engagement member and a second engagement member, wherein the first engagement member engages the bobbin in the ready position and the winding position, wherein the second engagement member engages the bobbin in the winding position and the unloading position;
   wherein the first and second engagement members both move in a direction parallel to the pivot arm axis, and wherein the first and second engagement members both expand to effect engagement with the bobbin.

2. The apparatus as set forth in claim 1, wherein the pivot arm does not rotate 360 degrees about the pivot arm axis.

3. The apparatus as set forth in claim 1, wherein the first engagement member rotates the bobbin in the winding position to effect the winding of the tire component onto the bobbin when the bobbin is located in the winding position, and wherein the second engagement member does not rotate the bobbin in the winding position, in the ready position, or in the unloading position.

4. The apparatus as set forth in claim 1, wherein the attachment member engages the tire component and effects attachment of the tire component to the bobbin when the bobbin is in the winding position, and wherein the cutter cuts the tire component when the bobbin is in the winding position.

5. The apparatus as set forth in claim 1, wherein the attachment member effects attachment of the tire component to the bobbin and the cutter cuts the tire component at the same time.

6. The apparatus as set forth in claim 1, wherein the tire component is an RFID tire component.

7. An apparatus, comprising:
   a tire component;
   a bobbin;
   a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;
   an attachment member that effects attachment of the tire component to the bobbin; and
   a cutter that cuts the tire component;
   wherein the pivot arm has a first engagement member and a second engagement member, wherein the first engagement member engages the bobbin in the ready position and the winding position, wherein the second engagement member engages the bobbin in the winding position and the unloading position;
   wherein the bobbin is a first bobbin, and further comprising a second bobbin, wherein the first bobbin has the tire component wound thereupon and is engaged by the second engagement member in the unloading position when the second bobbin is engaged by the first engagement member in the winding position.

8. The apparatus as set forth in claim 7, wherein the tire component extends from the first bobbin to the second bobbin, and wherein the tire component is cut by the cutter and attached to the second bobbin by the attachment member when the tire component extends from the first bobbin to the second bobbin.

9. An apparatus, comprising:
   a tire component;
   a bobbin;
   a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;
   an attachment member that effects attachment of the tire component to the bobbin; and
   a cutter that cuts the tire component; and a retainer that holds the bobbin in the winding position when the pivot arm disengages from the bobbin when the bobbin is in the winding position.

10. An apparatus, comprising:
    a tire component;
    a bobbin;
    a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;

an attachment member that effects attachment of the tire component to the bobbin;
a cutter that cuts the tire component; and a labeler that applies a label to the bobbin when the bobbin is located in the unloading position.

11. An apparatus, comprising:
a tire component;
a bobbin;
a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;
an attachment member that effects attachment of the tire component to the bobbin; and
a cutter that cuts the tire component;
wherein the bobbin has a positioning window that is an aperture that extends completely through the bobbin in a direction parallel to the pivot arm axis,
further comprising a sensor that utilizes the positioning window to sense an orientation of the bobbin when the bobbin is in the winding position.

12. An apparatus, comprising:
a tire component;
a bobbin;
a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;
an attachment member that effects attachment of the tire component to the bobbin; and
a cutter that cuts the tire component;
wherein the bobbin has a receiving cavity that receives the tire component when the attachment member effects attachment of the tire component to the bobbin.

13. The apparatus as set forth in claim 12, wherein the receiving cavity has a clip that engages and retains the tire component when the attachment member effects attachment of the tire component to the bobbin upon placement of the tire component into the receiving cavity.

14. The apparatus as set forth in claim 12, wherein the receiving cavity has a retaining plate and a spring that is compressed upon placement of the tire component into the receiving cavity, wherein the tire component engages the retaining plate when the tire component is placed into the receiving cavity, and wherein the retaining plate and spring retain the tire component to the bobbin.

15. An apparatus, comprising:
a tire component;
a bobbin;
a pivot arm that is configured for pivoting about a pivot arm axis to move the bobbin from a ready position to a winding position and to an unloading position, wherein the pivot arm rotates the bobbin to effect winding of the tire component onto the bobbin when the bobbin is located in the winding position;
an attachment member that effects attachment of the tire component to the bobbin; and
a cutter that cuts the tire component;
wherein the bobbin has a cutting cavity that receives a blade of the cutter when the cutter cuts the tire component.

16. The apparatus as set forth in claim 15, wherein the bobbin has a receiving cavity that receives the tire component when the attachment member effects attachment of the tire component to the bobbin;
wherein the cutting cavity is a first cutting cavity, wherein the bobbin has a second cutting cavity that is configured for receiving the blade of the cutter, and wherein the first and second cutting cavities extend radially inward from a winding surface of the bobbin, and wherein the first and second cutting cavities are located on opposite sides of the receiving cavity in a circumferential direction of the bobbin.

* * * * *